B. Mee.
Hose Coupling.

No. 64,437. Patented May. 7. 1867.

Witnesses.
W. A. Shaw
H. B. Renwick.

Inventor.
Barny Mee
per H. B. Renwick
attorney

UNITED STATES PATENT OFFICE.

BARNEY MEE, OF TROY, NEW YORK.

IMPROVEMENT IN HOSE-COUPLINGS.

Specification forming part of Letters Patent No. 64,437, dated May 7, 1867.

*To all whom it may concern:*

Be it known that I, BARNEY MEE, of Troy, Rensselaer county, in the State of New York, have invented a new and useful Coupling for Hose and other Pipes; and that the following, taken in connection with the drawings, is a full, clear, and exact description thereof.

Figure 3:
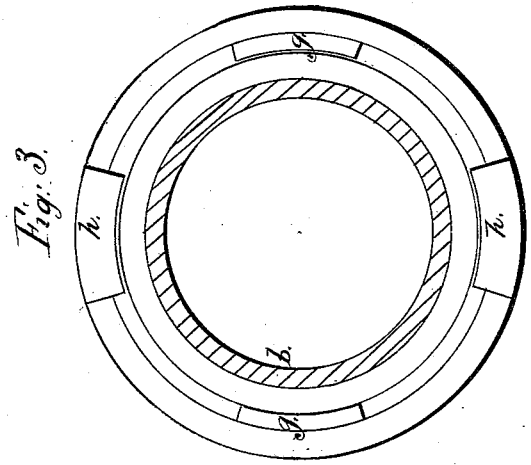
Figure 1:
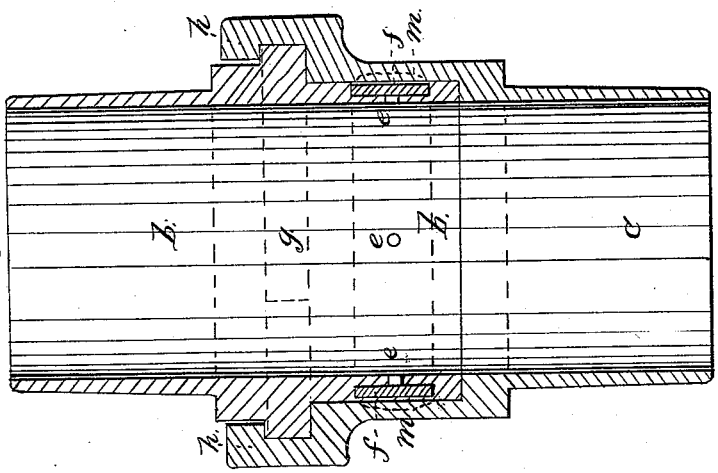
Figure 2:
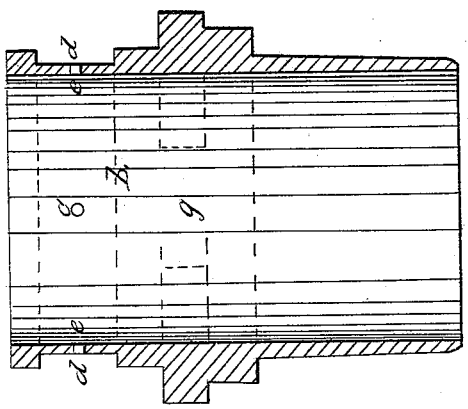

In the drawings, Figure 1 is an axial section through the coupling. Fig. 2 is an axial section through the male part thereof, with the packing-ring removed; and Fig. 3 is an elevation of the coupling from the end $a$ of Fig. 1.

The object of my invention is to make a tight coupling without the use of the ordinary washer and the loose ring applied to the male end of the coupling, the former being in use in all couplings known to me, and the latter in all screw-couplings; and also dispense with all contrivances for forcing the two parts of the coupling together in the line of their axes in order to compress the washer.

The drawings represent the coupling in the form that I prefer to make it. The male part of the coupling is represented at $b$, the female part at $c$. The former slides easily into the latter, as usual, and has formed in it a recess or annular groove, $d$, and several small holes, $e$, leading from the hollow of the male part into the groove. In this groove is placed a ring of vulcanized rubber or other suitable packing. In the flange of the male member of the coupling are cut slots, $g$ $g$, and upon the flange of the female member are formed hooks, $h$ $h$. In putting the parts together they are applied each to each, so that the slots are in line with the hooks. The latter are then pushed through the former, and one member of the coupling is turned on its axis, so that the hooks rest upon the flange of the female member, the two members being thus secured by an ordinary bayonet-joint. As soon as pressure is applied on the inside of the coupling the fluid will enter the holes $e$ $e$ $e$ and press upon the inside of the packing-ring, forcing its periphery against the interior of the female member of the coupling, and preventing leakage between the exterior of the male and the interior of the female parts of the coupling. I sometimes intend to form opposite the packing-ring an annular depression in the female part of the coupling, as indicated by dotted lines at $m$ $m$, Fig. 1. When pressure is applied inside the coupling a portion of the packing-ring will be forced into this depression, and the ring itself will hold the two members of the coupling together as soon as pressure is applied, thus dispensing with the hooks and slots; but I prefer to use the bayonet-fastening, or some well-known substitute or mechanical equivalent therefor, as the parts of the coupling are thereby held in place prior to the application of pressure inside of the coupling, wishing it to be distinctly understood, at the same time, that a screw or wedge, or other mode of holding the parts in place, may be used in place of the bayonet-fastening, as substitutes or mechanical equivalents therefor, without changing the principle of my invention. I intend at times to make the recess $f$ dovetailed in its section, and to force the packing-ring into it, thus insuring the tightness of the joint between the ring and the male member of the coupling; but this construction is more judicious in theory than in practice, as I have found by actual trial that the construction represented in the drawings is tight at the highest pressures usually applied to hose.

I do not deem it necessary to enter in detail into the difficulties attending the use of the ordinary washers, stating only that they fall off and are often lost when most wanted, that they wear out quickly, and seldom form a tight joint. Nor do I deem it necessary to point out the advantages of my coupling further than to state that it is cheaper than the old one, that it may be put together in less time, that it makes a tight joint, that the packing-ring wears but little, if at all, and that it is not liable to fall off.

I claim as of my own invention—

1. A packing-ring applied in a recess in the male part of a coupling, in combination with a female member of the same coupling, the combination being substantially as specified.

2. I claim, in combination with a packing-ring applied and acting as specified, and the male and female parts of a coupling, a bayonet-fastening, or the mechanical equivalent or substitute therefor, for holding the parts in place until pressure is applied to the packing-ring, the combination being substantially such as set forth.

3. I claim an annular recess in combination with the male part of a coupling, and with holes leading into it from the hollow of the coupling, forming a seat, and an apparatus for applying pressure to a packing-ring, the combination being as described.

4. I claim an annular recess formed in the periphery of the male part of a coupling, provided with holes leading into it from the hollow of the coupling, in combination with the female part of a coupling, whereby a packing-ring may be applied so as to pack a coupling-joint, the combination being as described.

BARNEY MEE.

Witnesses:
JOHN F. WINSLOW,
H. J. LORD,
CHESTER GRISWOLD.